United States Patent [19]

Hawkins

[11] Patent Number: 4,774,530

[45] Date of Patent: Sep. 27, 1988

[54] INK JET PRINTHEAD

[75] Inventor: William G. Hawkins, Webster, N.Y.

[73] Assignee: Xerox Corporation, Stamford, Conn.

[21] Appl. No.: 115,271

[22] Filed: Nov. 2, 1987

[51] Int. Cl.[4] .............................................. G01D 15/16

[52] U.S. Cl. .................................. 346/140 R; 346/75; 156/147

[58] Field of Search ............. 346/140 PD, 140 R, 1.1, 346/75; 156/647, 654, 657, 662, 659.1

[56] References Cited

U.S. PATENT DOCUMENTS

| | | | |
|---|---|---|---|
| 4,463,359 | 7/1984 | Ayata et al. | 346/1.1 |
| 4,601,777 | 7/1986 | Hawkins et al. | 156/626 |
| 4,638,337 | 1/1987 | Torpey et al. | 346/140 R |
| 4,639,748 | 1/1987 | Drake et al. | 346/140 R |

*Primary Examiner*—Clifford C. Shaw
*Assistant Examiner*—Mark Reinhart
*Attorney, Agent, or Firm*—Robert A. Chittum

[57] ABSTRACT

An improved ink jet printhead is disclosed which comprises an upper and a lower substrate that are mated and bonded together with a thick insulative layer sandwiched therebetween. One surface of the upper substrate has etched therein one or more grooves and a recess which, when mated with the lower substrate, will serve as capillary-filled ink channels and ink supplying manifold respectively. The grooves are open at one end and closed at other end. The open ends will serve as the nozzles. The manifold recess is adjacent the groove closed ends. Each channel has a heating element located upstream of the nozzle. The heating elements are selectively addressable by input signals representing digitized data signals to produce ink vapor bubbles. The growth and collapse of the bubbles expel ink droplets from the nozzles and propel them to a recording medium. Recesses patterned in the thick layer expose the heating elements to the ink, thus placing them in a pit, and provide a flow path for the ink from the manifold to the channels by enabling the ink to flow around the closed ends of the channels, thereby eliminating the fabrication steps required to open the groove closed ends to the manifold recess, so that the printed fabrication process is simplified.

6 Claims, 4 Drawing Sheets

INK JET PRINTHEAD

BACKGROUND OF THE INVENTION

1. Field of the Invention

This invention relates to ink jet printing, and more particularly to a thermal ink jet printhead having improved passivation of active devices and a more cost effective fabrication process.

2. Description of the Prior Art

In existing thermal ink jet printing, the printhead comprises one or more ink filled channels, such as disclosed in U.S. Pat. No. 4,463,359 to Ayata et al, communicating with a relatively small ink supply chamber at one end and having an opening at the opposite end, referred to as a nozzle. A thermal energy generator, usually a resistor, is located in the channels near the nozzles a predetermined distance therefrom. The resistors are individually addressed with a current pulse to momentarily vaporize the ink and form a bubble which expels an ink droplet. As the bubble grows, the ink bulges from the nozzle and is contained by the surface tension of the ink as a meniscus. As the bubble begins to collapse, the ink still in the channel between the nozzle and bubble starts to move towards the collapsing bubble, causing a volumetric contraction of the ink at the nozzle and resulting in the separation of the bulging ink as a droplet. The acceleration of the ink out of the nozzle while the bubble is growing provides the momentum and velocity of the droplet in a substantially straight line direction towards a recording medium, such as paper.

The printhead of U.S. Pat. No. 4,463,359 has one or more ink-filled channels which are replenished by capillary action. A meniscus is formed at each nozzle to prevent ink from weeping therefrom. A resistor or heater is located in each channel upstream from the nozzles. Current pulses representative of data signals are applied to the resistors to momentarily vaporize the ink in contact therewith and form a bubble for each current pulse. Ink droplets are expelled from each nozzle by the growth and collapse of the bubbles. Current pulses are shaped to prevent the meniscus from breaking up and receding too far into the channels, after each droplet is expelled. Various embodiments of linear arrays of thermal ink jet devices are shown such as those having staggered linear arrays attached to the top and bottom of a heat sinking substrate and those having different colored inks for multiple colored printing.

U.S. Pat. No. 4,601,777 to Hawkins et al discloses several fabricating processes for ink jet printheads, each printhead being composed of two parts aligned and bonded together. One part is substantially a flat substrate which contains on the surface thereof a linear array of heating elements and addressing electrodes, and the second part is a substrate having at least one recess anisotropically etched therein to serve as an ink supply manifold when the two parts are bonded together. A linear array of parallel grooves are formed in the second part, so that one end of the grooves communicate with the manifold recess and the other ends are open for use as ink droplet expelling nozzles. Many printheads can be simultaneously made by producing a plurality of sets of heating element arrays with their addressing electrodes on, for example, a silicon wafer and by placing alignment marks thereon at predetermined locations. A corresponding plurality of sets of channels and associated manifolds are produced in a second silicon wafer and, in one embodiment, alignment openings are etched thereon at predetermined locations. The two wafers are aligned via the alignment openings and alignment marks and then bonded together and diced into many separate printheads. A number of printheads can be fixedly mounted on a pagewidth configuration which confronts a moving recording medium for pagewidth printing or individual printheads may be adapted for carriage type ink jet printing. In this patent, the parallel grooves which are to function as the ink channels when assembled are individually milled as disclosed in FIG. 6B or anisotropically etched concurrently with the manifold recess. In this latter fabrication approach, the grooves must be opened to the manifold; either they must be diced open as shown in FIGS. 7 and 8, or an additional isotropic etching step must be included. This invention eliminates the fabrication step of opening the elongated grooves to the manifold when they are produced by etching.

U.S. Pat. No. 4,638,337 to Torpey et al discloses an improved thermal ink jet printhead similar to that of Hawkins et al, but has each of its heating elements located in a recess. The recess walls containing the heating elements prevent the lateral movement of the bubbles through the nozzle and therefore the sudden release of vaporized ink to the atmosphere, known as blowout, which causes ingestion of air and interrupts the printhead operation whenever this event occurs. In this patent, a thick film organic structure such as Riston® is interposed between the heater plate and the channel plate. The purpose of this layer is to have recesses formed therein directly above the heating elements to contain the bubble which is formed over the heating element to enable an increase in droplet velocity without the occurrent of vapor blowout.

U.S. Pat. No. 4,639,748 to Drake et al discloses an ink jet printhead similar to that described in the patent to Hawkins et al, but additionally containing an internal integrated filtering system and fabricating process therefor. Each printhead is composed of two parts aligned and bonded together. One part is substantially flat substrate which contains on the surface thereof a linear array of heating elements and addressing electrodes. The other part is a flat substrate having a set of concurrently etched recesses in one surface. The set of recesses include a parallel array of elongated recesses for use as capillary filled, ink channels having ink droplet emitting nozzles at one end and having interconnection with a common ink supplying manifold recess at the other ends. The manifold recess contains an internal closed wall defining a chamber with an ink fill hole. Small passageways are formed in the internal chamber walls to permit passage of ink therefrom into the manifold. Each of the passageways have smaller cross-sectional flow areas than the nozzles to filter the ink, while the total cross sectional flow area of the passageways is larger than the total cross sectional flow area of the nozzles. As in Hawkins et al, many printheads can be simultaneously made by producing a plurality of sets of heating element arrays with their addressing electrodes on a silicon wafer and by placing alignment marks thereon at predetermined locations. A corresponding plurality of sets of channels and associated manifolds with internal filters are produced on a second silicon wafer and in one embodiment alignment openings are etched thereon at predetermined locations. The two wafers are aligned via the alignment openings and alignment marks, then bonded together and diced into many separate printheads.

SUMMARY OF THE INVENTION

It is an object of the present invention to provide an improved ink jet printhead having fewer fabricating steps to produce a more cost effective printhead.

It is another object of this invention to eliminate the fabrication step of opening one end of the sets of anisotropically etched grooves with the manifold by providing an ink flow path therearound.

It is still another object of the invention to provide improved passivation of the addressing electrodes by the placement of a thick film of solder mask or laminates over the active circuitry on the heater plate.

It is yet another object of this invention to provide the electrode passivation and the means to provide an ink flow path between the manifold and the individual ink channels by the placement of a thick film organic structure such as Vacrel®, Riston®, Probimer 52®, or polyimide and removing the thick film structure from over the heating elements and the area in the vicinity of the interfacing area of ink channel grooves and manifold.

In the present invention, a thick film organic structure such as Vacrel®, Riston®, Probimer 52®, or polyimide is interposed between the heater plate and the channel plate. This layer is between 10 to 50 microns thick, but the preferable thickness range is 20–40 microns. Recesses are then formed in the thick film organic structure to expose each heating elements. This arrangement places each heating element at the bottom of a recess and prevents the occurrence of vapor blowout. A second elongated pit or groove is formed in a predetermined location, so that when the channel plate is aligned and bonded to the thick film structure, the ink may flow from the manifold to the ink channels. In addition, this thick film organic structure is used as the passivation layer for the active circuitry on the heater plate.

A more complete understanding of the present invention can be obtained by considering the following detailed description in conjunction with the accompanying drawings wherein like index numerals indicate like parts.

DESCRIPTION OF THE PREFERRED EMBODIMENT

Figure 1:
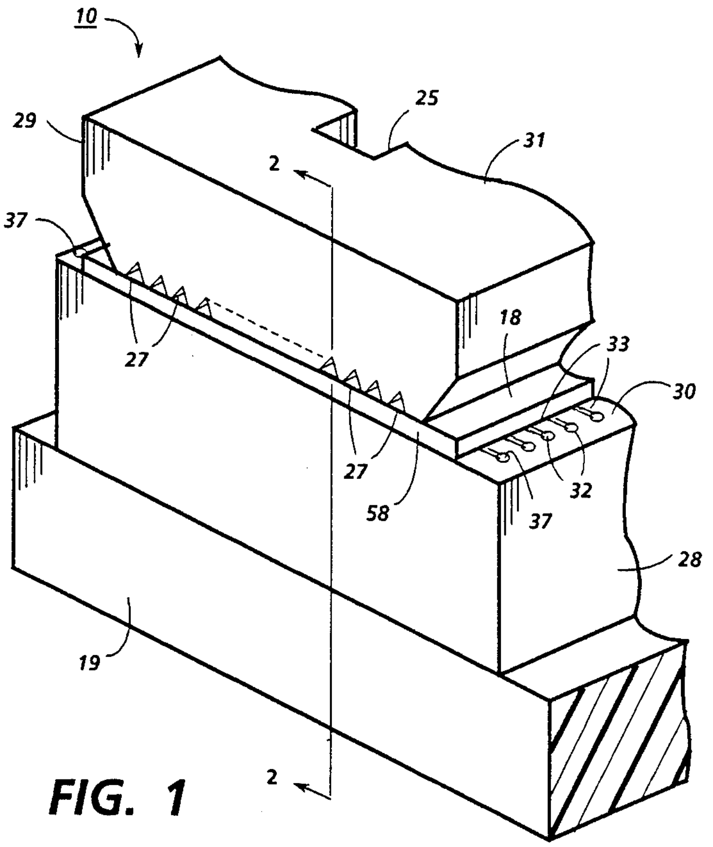
FIG. 1 is an enlarged schematic isometric view of a printhead mounted on a daughter board showing the droplet emitting nozzles.
Figure 2:
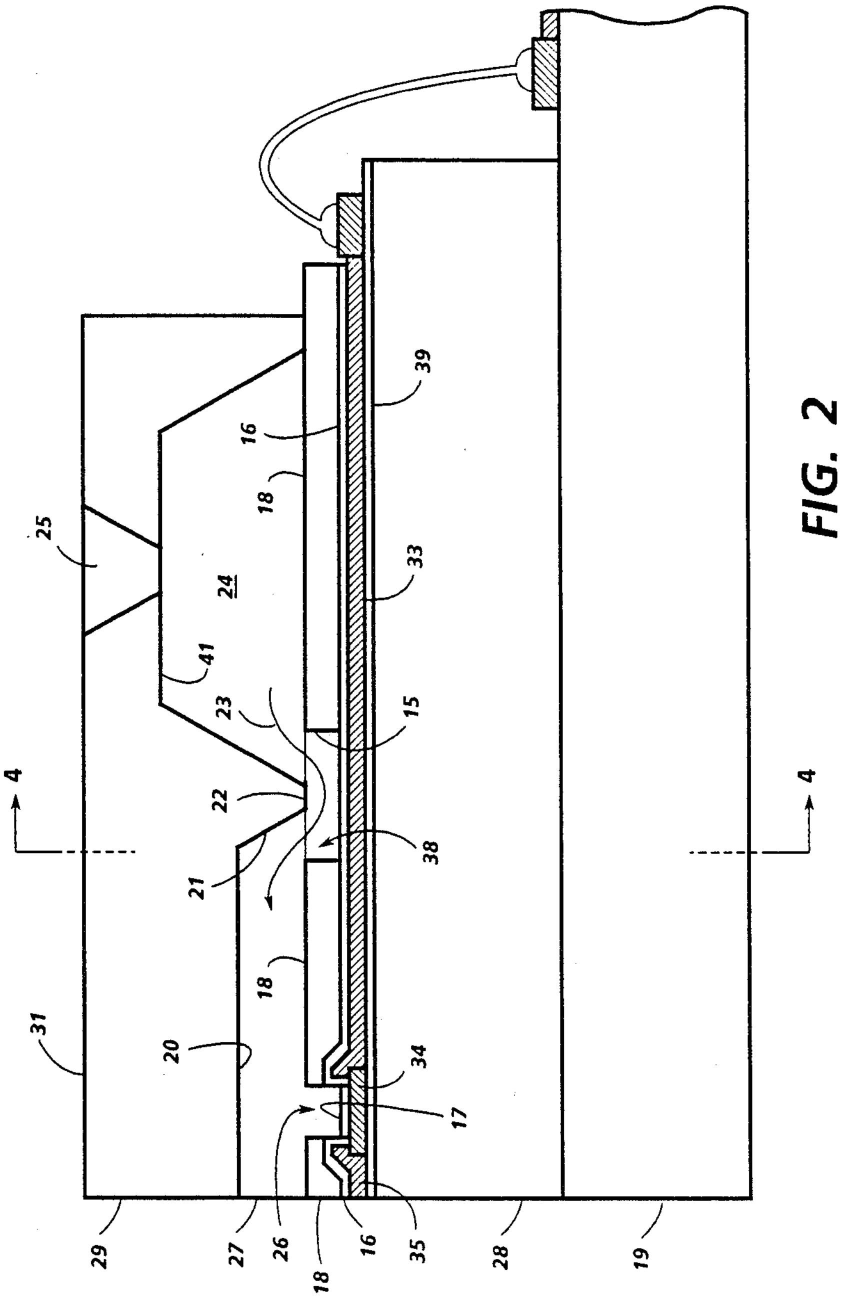
FIG. 2 is an enlarged cross-sectional view of FIG. 1 as viewed along the line 2—2 thereof and showing the electrode passivation and ink flow path between the manifold and the ink channels.

An enlarged, schematic isometric view of the front face 29 of the printhead 10 showing the array of droplet emitting nozzles 27 is depicted in FIG. 1. Referring also to FIG. 2, discussed later, the lower electrically insulating substrate or heating element plate 28 has the heating elements 34 and addressing electrodes 33 patterned on surface 30 thereof, while the upper substrate or channel plate 31 has parallel grooves 20 which extend in one direction and penetrate through the upper substrate front face edge 29. The other end of grooves terminate at slanted wall 21, the floor 41 of the internal recess 24 which is used as the ink supply manifold for the capillary filled ink channels 20, has an opening 25 therethrough for use an an ink fill hole. The surface of the channel plate with the grooves are aligned and bonded to the heater plate 28, so that a respective one of the plurality of heating elements 34 is positioned in each channel, formed by the grooves and the lower substrate or heater plate. Ink enters the manifold formed by the recess 24 and the lower substrate 28 through the fill hole 25 and by capillary action, fills the channels 20 by flowing through an elongated recess 38 formed in the thick film insulative layer 18. The ink at each nozzle forms a meniscus, the surface tension of which prevents the ink from weeping therefrom. The addressing electrodes 33 on the lower substrate or channel plate 28 terminate at terminals 32. The upper substrate or channel plate 31 is smaller than that of the lower substrate in order that the electrode terminals 32 are exposed and available for wire bonding to the electrodes on the daughter board 19, on which the printhead 10 is permanently mounted. Layer 18 is a thick film passivation layer, discussed later, sandwiched between upper and lower substrates. This layer is etched to expose the heating elements, thus placing them in a pit, and is etched to form the elongated recess to enable ink flow between the manifold 24 and the ink channels 20. In addition, the thick film insulative layer is etched to expose the electrode terminals.

A cross sectional view of FIG. 1 is taken along view line 2—2 through one channel and shown as FIG. 2 to show how the ink flows from the manifold 24 and around the end 21 of the groove 20 as depicted by arrow 23. As is disclosed in U.S. Pat. No. 4,638,337 to Torpey et al, a plurality of sets of bubble generating heating elements 34 and their addressing electrodes 33 are patterned on the polished surface of a single side polished (100) silicon wafer. Prior to patterning, the multiple sets of printhead elctrodes 33, the resistive material that serves as the heating elements, and the common return 35, the polished surface of the wafer is coated with an underglaze layer 39 such as silicon dioxide, having a thickness of about 2 micrometers. The resistive material may be a doped polycrystalline silicon which may be deposited by chemical vapor deposition (CVD) or any other well known resistive material such as zirconium boride ($ZrB_2$). The common return and the addressing electrodes are typically aluminum leads deposited on the underglaze and over the edges of the heating elements. The common return ends or terminals 37 and addressing electrode terminals 32 are positioned at predetermined locations to allow clearance for wire bonding to the electrodes (not shown) of the daughter board 19, after the channel plate 31 is attached to make a printhead. The common return 35 and the addressing electrodes 33 are deposited to a thickness of 0.5 to 3 micrometers, with the preferred thickness being 1.5 micrometers.

In the preferred embodiment, polysilicon heating elements are used and a silicon dioxide thermal oxide layer 17 is grown from the polysilicon in high temperature steam. The thermal oxide layer is typically grown to a thickness of 0.5 to 1 micrometer to protect and insulate the heating elements from the conductive ink. The thermal oxide is removed at the edges of the polysilicon heating elements for attachment of the addressing electrodes and common return, which are then patterned and deposited. If a resistive material such as zirconium boride is used for the heating elements, then other suitable well known insulative materials may be used for the protective layer thereover. Before electrode passivation, a tantalum (Ta) layer (not shown) may be optionally deposited to a thickness of about 1 micrometer on the heating element protective layer 17 for added protection thereof against the cavitational forces generated by the collapsing ink vapor bubbles during printhead operation. The tantalum layer is etched off all but the protective layer 17 directly over the heating elements using, for example, $CF_4/O_2$ plasma etching. For electrode passivation, a two micrometer thick phosphorous doped CVD silicon dioxide film 16 is deposited over the entire wafer surface, including the plurality of sets of heating elements and addressing electrodes. The passivation film 16 provides an ion barrier which will protect the exposed electrodes from the ink. Other ion barriers may be used, such as, for example, polyimide, plasma nitride, as well as the above-mentioned phosphorous doped silicon dioxide, or any combinations thereof. An effective ion barrier layer is achieved when its thickness is between 1000 angstrom and 10 micrometers, with the preferred thickness being 1 micrometers. The passivation film or layer 16 is etched off of the terminal ends of the common return and addressing electrodes for wire bonding later with the daughter board electrodes. This etching of the silicon dioxide film may be by either the wet or dry etching method. Alternatively, the electrode passivation may be accomplished by plasma deposited silicon nitrite ($Si_3N_4$).

Next, a thick film type insulative layer 18 such as, for example Riston®, Vacrel®, Probimer 52®, or polyimide, is formed on the passivation layer 16 having a thickness of between 10 and 100 micrometers and preferably in the range of 25 to 50 micrometers. The insulative layer 18 is photolithographically processed to enable etching and removal of those portions of the layer 18 over each heating element (forming recesses 26), the elongated recess 38 for providing ink passage from the manifold 24 to the ink channels 20, and over each electrode terminal 32, 37. The elongated recess 38 is formed by the removal of this portion of the thick film layer 18. Thus, the passivation layer 16 alone protects the electrodes 33 from exposure to the ink in this elongated recess 38.

Figure 3:
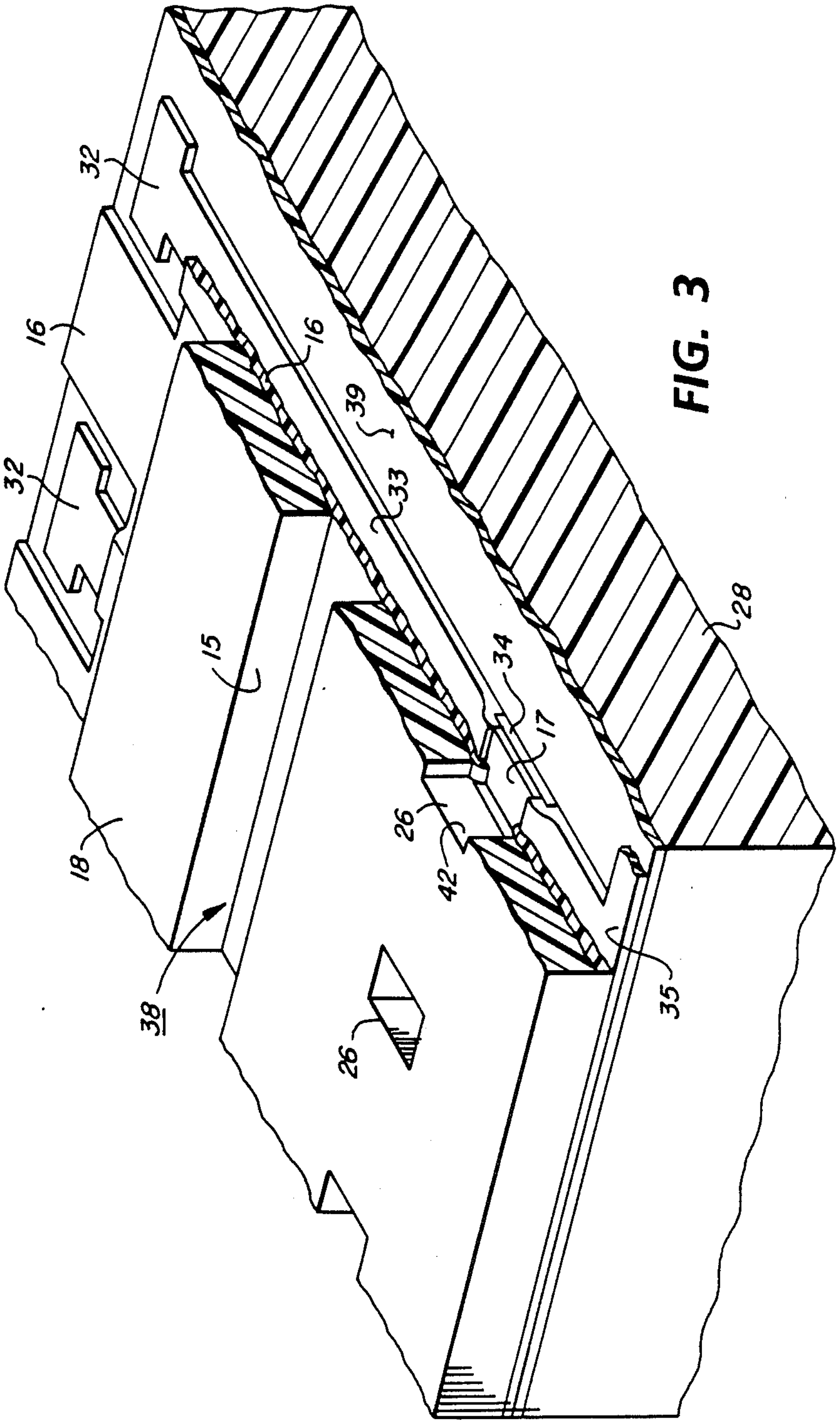
FIG. 3 is an enlarged partially shown isometric view of the heating element plate partially sectioned to show the recessed heating element and the second recess that permits the flow of ink from the manifold to the ink channel.

In FIG. 3, an enlarged, partially sectioned isometric view of the heating element plate 28 is shown. Part of the electrode passivation layer 16 and the overlaying relatively thick insulating layer 18 (preferably Riston®, Vacrel®, polyimide, or equivalent) is removed from a portion of one addressing electrode for ease of understanding the heating element plate construction. Each layer 18 is photolithographically patterned and etched to remove it from the heating element 34 and its protective layer 17, a predetermined location to permit ink flow from the manifold to the channels, and to remove it from the electrode terminals 32, 37, so that a recess or pit is formed having walls 42 that exposes each heating element, and walls 15 defining an elongated recess to open the ink channels to the manifold. The recess walls 42 inhibit lateral movement of each bubble generated by the pulsed heating element which lie at the bottom of recesses 26, and thus promote bubble growth in a direction normal thereto. Therefore, as disclosed in U.S. Pat. No. 4,638,337, the blowout phenomena of releasing a burst of vaporized ink is avoided.

The passivated addressing electrodes are exposed to ink along the majority of their length and any pin hole in the normal electrode passivation layer 16 exposes the electrode 33 to electrolysis which would eventually lead to operational failure of the heating element addressed thereby. Accordingly, an added protection of the addressing electrode is obtained by the thick film layer 18, since the electrodes are passivated by two overlapping layers, passivation layer 16 and a thick film layer 18.

Figure 5:
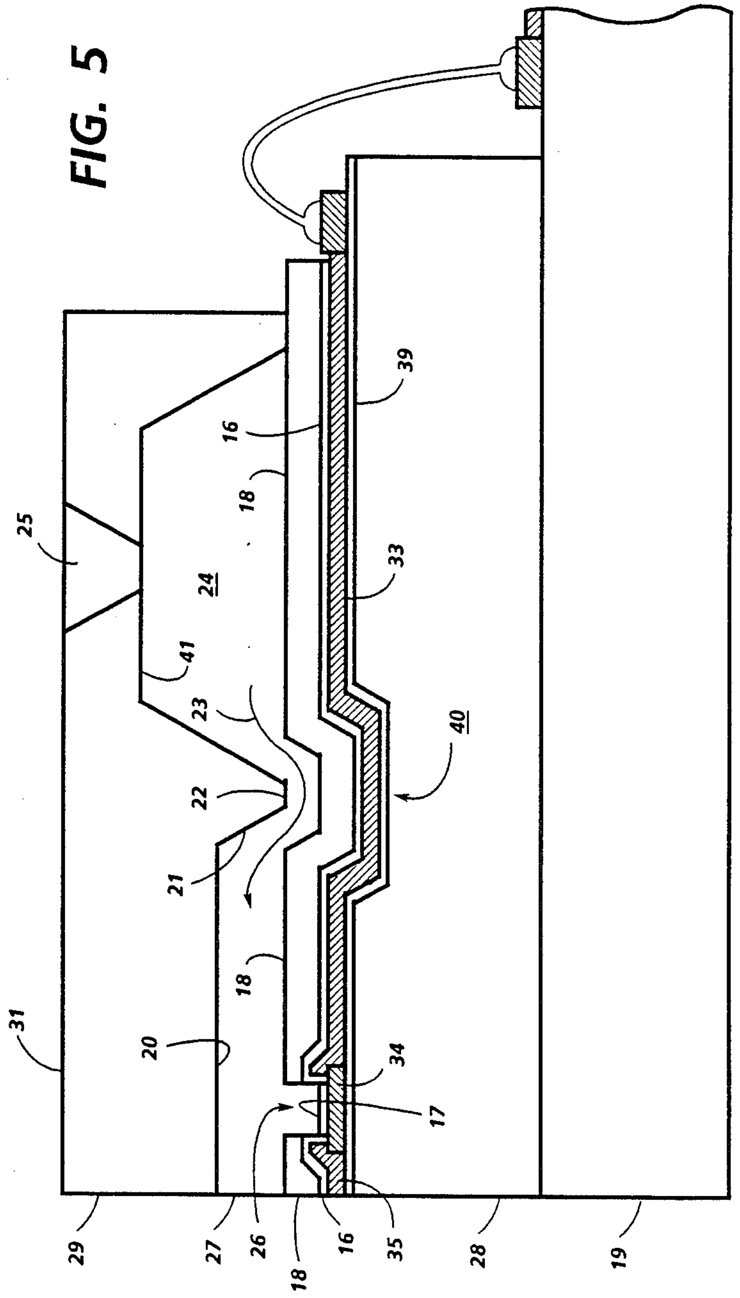
FIG. 5 is an enlarged cross-sectional view of an alternate embodiment of the printhead in FIG. 1 as viewed along the line 2—2 thereof.

FIG. 5 is a similar view to that of FIG. 2 with a shallow anisotropically etched groove 40 in the heater plate, which must therefore be silicon, prior to formation of the underglaze 39 and patterning of the heating elements 34, electrodes 33 and common return 35. This recess 40 permits the use of only the thick film insulative layer 18 and eliminates the need for the usual electrode passivating layer 16. Since the thick film layer 18 is impervious to water and relatively thick (20 to 40 micrometers), contamination introduced into the circuitry will be much less than with only the relatively thin passivation layer 16 well known in the prior art. It is important to recognize that the heater plate is a fairly hostile environment for integrated circuits. Commercial ink generally entails a low attention to purity. As a result, the active part of the heater plate will be at elevated temperature adjacent to a contaminated aqueous ink solution which undoubtedly abounds with mobile ions. In addition, it is desirable to run the heater plate at a voltage of 30 to 50 volts, so that there will be a substantial field present. Thus, the thick film insulative layer 18 provides improved protection for the active devices and provides improved protection resulting in longer operating lifetime for the heater plate.

Figure 4:
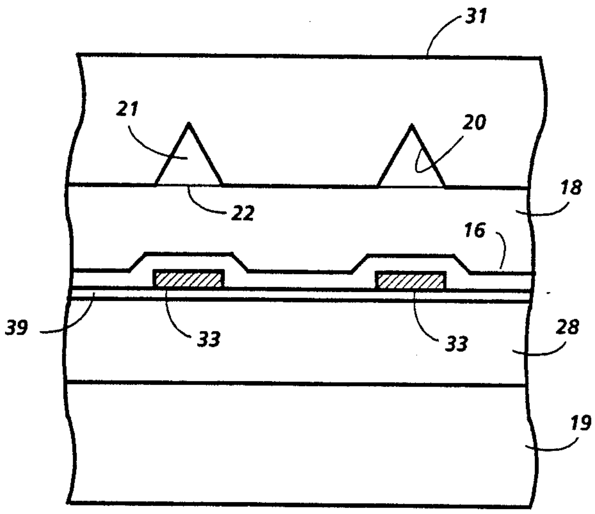
FIG. 4 is an enlarged cross-sectional view of FIG. 2 as viewed along the line 4—4 thereof.

As disclosed in U.S. Pat. Nos. 4,601,777 and 4,638,337, the channel plate is formed from a two side polished, (100) silicon wafer to produce a plurality of upper substrates 31 for the printhead. After the wafer is chemically cleaned, a pyrolytic CVD silicon nitrite layer (not shown) is deposited on both sides. Using conventional photolithography, a via for fill hole 25 for each of the plurality of channel plates 31 and at least two vias for alignment openings (not shown) at predetermined locations are printed on one wafer side. The silicon nitrite is plasma etched off of the patterned vias representing the fill holes and alignment openings. A potassium hydroxide (KOH) anisotropic etch may be used to etch the fill holes and alignment openings. In this case, the {111} planes of the (100) wafer make an angle of 54.7 degrees with the surface of the wafer. The fill holes are small square surface patterns of about 20 mils (25 mm) per side and the alignment openings are about 60 to 80 mis (1.5 to 2 mm) square. Thus, the alignment openings are etched entirely through the 20 mil (0.5 mm) thick wafer, while the fill holes are etched to a terminating apex at about halfway through to three-quarters through the wafer. The relatively small square fill hole is invariant to further size increase with continued etching so that the etching of the alignment openings and fill holes are not significantly time constrained. Next, the opposite side of the wafer is photolithographically patterned, using the previously etched alignment holes as a reference to form the relatively large rectangular recesses 24 and sets of elongated, parallel channel recesses that will eventually become the ink manifolds and channels of the printheads. The surface 22 of the wafer containing the manifold and channel recesses are portions of the original wafer surface (covered by a silicon nitride layer) on which adhesive will be applied later for bonding it to the substrate containing the plurality of sets of heating elements. A final dicing cut, which produces end face 29, opens one end of the elongated groove 20 producing nozzles 27. The other ends of the channel groove 20 remain closed by end 21. However, the alignment and bonding of the channel plate to the heater plate places the ends 21 of channels 20 directly over elongated recess 38 in the thick film insulative layer 18 as shown in FIG. 2 or directly above the recess 40 as shown in FIG. 5 enabling the flow of ink into the channels from the manifold as depicted by arrows 23. FIG. 4 is a partial cross sectional view of the printhead shown in FIG. 2 as viewed along view line 4—4, which shows that the elongated recess 38 in the thick film layer 18 extends the full width of all of the channels 20 and in a direction perpendicular thereto.

In recapitulation, this invention relates to a simplifying method of fabrication of a thermal ink jet printhead. A thick film of solder mask material or other organic structure such as Riston®, Vacrel®, Probimer 52®, or polyimide, or the like is interposed between the heater plate and the channel plate. In the prior art, this layer enables the formation of pits over the heating elements which will contain the temporary bubbles so that droplet velocity may be increased without vapor blowout and the consequent congestion of air. By adding a second elongated recess behind the heating element pits, the ink from the reservoir can communicate with the channels thereby eliminating the need to remove the silicon between the channel grooves and the manifold recess. The elongated recess or trough provides a bypass for the ink. Patterning the thick film insulative layer via the photoresist technique is much simpler and more easily controlled than further etching or milling to remove the silicon between the channel grooves and the manifold recess. In a second embodiment, the heater plate has a shallow elongated recess etched therein prior to formation of the heating element array and associated addressing electrodes. This recess in the heater plate enables the use of the thick film insulative layer alone as the passivation layer further simplifying the fabrication process while maintaining high integrity and pin hole free protection of the electrodes from the ink.

Many modifications and variations are apparent from the foregoing description of the invention, and all such modifications and variations are intended to be within the scope of the present invention. For example, such a two part configuration could be useful for other arbitrary uses and for other types of fluid mediums, whether gas or liquid, whereby flow passages in general are provided between interconnecting orientation dependent etched (ODE) silicon structures.

I claim:

1. An improved ink jet printhead of the type having a silicon upper substrate in which one surface thereof is anisotropically etched to form both a set of parallel grooves for subsequent use as ink channels and an anisotropically etched recess for subsequent use as a manifold, and further having a lower substrate in which one surface thereof has an array of heating elements and addressing electrodes formed thereon, the upper and lower substrates being aligned, mated, and bonded together to form the printhead with a thick film insulative layer sandwiched therebetween, the thick film insulative layer having been deposited on the surface of the lower substrate and over the heating elements and addressing electrodes and patterned to form recesses therethrough to expose the heating elements and terminal ends of the addressing electrodes prior to said mating and bonding of the substrates, wherein the improvement comprises:

said etched grooves each being open at one end and closed at the opposite end, the open ends serving as ink droplet emitting nozzles, and said etched recess being adjacent but separate from the groove closed ends; and an elongated opening being formed in the thick film insulative layer currently with the heating element and electrode recesses and at a location which confronts the groove closed ends, the elongated opening having a size sufficient to produce an ink flowthrough passageway between the manifold and the channels without requiring the removal of the channel closed ends, thereby cost effectively simplifying the printhead fabrication process.

2. The printhead of claim 1, wherein a passivation layer is formed on the heating elements and electrodes on the surface of the lower substrate prior to the deposition of the thick film insulative layer; and wherein the passivation layer remains in tact after formation of the recesses in the thick film insulative layer to expose the heating elements and/or electrode terminals and to provide the ink passageway between the manifold and the channels, in order to retain an ion barrier between said heating elements and electrodes and the ink because they would otherwise be exposed to said ink through the recesses.

3. The printhead of claim 2, wherein the passivation layer is a 1000 angstrom to 10 micrometer thick layer of polyimide, plasma nitride, phosphorus doped silicon dioxide, or combinations thereof; and wherein the thick film insulative layer is a 10 to 100 micrometers thick layer of polyimide.

4. An ink jet printhead comprising:

a silicon upper substrate having on one surface thereof a plurality of anisotropically etched parallel grooves and an anisotropically etched recess for subsequent use as ink channels and ink supplying manifold, respectively, the grooves each having an open end and a closed end, the recess being adjacent the groove closed ends but separate therefrom;

a lower substrate having formed on one surface thereof an array of heating elements and associated addressing electrodes for selectively addressing individual heating elements with a current pulse representing digitized data signals;

a passivating layer being deposited over the heating elements and addressing electrodes, the electrodes having terminal ends for use as contact pads, and said contact pads being cleared of the passivating layer to enable electrical connection therewith;

a thick film insulative layer being deposited on the passivating layer and patterned to remove the thick film insulative layer over the heating elements and contact pads, the thick film insulative layer having an outer surface and a trough therein of predetermined size and location;

aligning, mating, and bonding the upper and lower substrates together to form the printhead with their respective surfaces containing the anisotropically etched recesses and the thick film insulative layer contacting each other, so that each etched groove has a heating element therein located a predetermined distance from the associated groove open end, and so that the trough in the thick film insulative layer is located in alignment with the etched groove closed end to provide an ink flow path from the manifold to the channels without the need to provide communication between the etched grooves and manifold recess during the fabrication of the upper substrate;

means for supplying ink to the manifold in the upper substrate of the printhead; and means for applying the digitized data signals to the contact pads of the printhead.

5. The printhead of claim 4, wherein the trough is formed in the thick film insulative layer surface by concurrently patterning and removing the thick film insulative layer from an area of predetermined size and location while it is being removed from the heating elements and contact pads.

6. The printhead of claim 4, wherein the lower substrate is silicon; and wherein the trough is formed by anisotropically etching an elongated recess in the surface of said lower substrate prior to forming the heating elements and addressing electrodes thereon, so that the addressing electrodes and subsequently deposited thick film insulative layer follow the surface contour of the lower substrate

* * * * *